Figure 1:
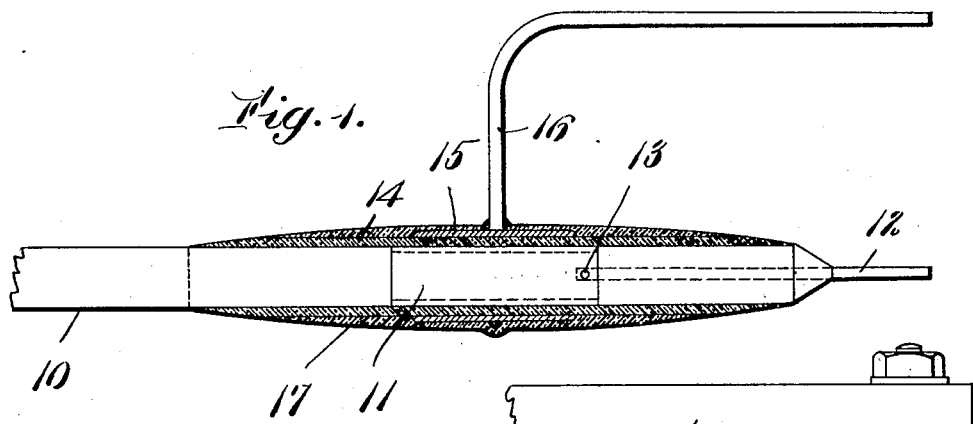

UNITED STATES PATENT OFFICE.

CHARLES L. KASSON, OF MATTAPAN, AND THOMAS H. HAINES, OF DORCHESTER, MASSACHUSETTS.

METHOD OF AND APPARATUS FOR INSULATION TESTING.

1,407,069. Specification of Letters Patent. Patented Feb. 21, 1922.

Application filed February 17, 1920. Serial No. 359,326.

*To all whom it may concern:*

Be it known that we, CHARLES L. KASSON and THOMAS H. HAINES, citizens of the United States, and residents of Mattapan and Dorchester, respectively, in the county of Suffolk and State of Massachusetts, have invented an Improvement in Methods of and Apparatus for Insulation Testing, of which the following description, in connection with the accompanying drawings, is a specification, like letters on the drawings representing like parts.

Our present invention relates to electrical testing and testing devices, and more particularly to methods of testing and to testing devices for use in detecting defective units of suspension type insulators under actual service conditions.

In the methods of testing for defective units of suspension type insulators on high tension transmission lines used heretofore, it has been necessary to shut down the line during the testing operation, which is troublesome and expensive, or else to short circuit the connecting ends of each unit of the strings of insulators successively, as the testing proceeds, with the possibility always of injuring the operator, or knocking out the line. In this latter method, the danger of knocking out the line, due to short circuiting the only remaining good unit of the string is so great that preliminary testing of each unit must take place in the effort to discover whether or not it is advisable to actually test the string for defective units. Even such preliminary test is not a sure guide, and it is necessary for the operator to be particularly skilled in the art of testing, to be able to obtain any information from the preliminary test. And if the preliminary test discloses the fact that there is probably but one good unit left in the string, in order to prevent injury to the line and possible injury to the operator, it is advisable not to test the string, at least under service conditions, but to wait until the power is cut off the line for some reason, when the suspected defective string is replaced by a good string, and the units of the defective string tested in the laboratory. Again, it is necessary to test the units of the strings in predetermined order to prevent the possibility of knocking out the line and injuring the operator.

Our present invention obviates the objections noted above, and enables us to test for defective units of strings of insulators while the strings are in position and the lines operating under normal load conditions, and also to test the units in any desired order. Our invention obviates the objections noted above in that it is practically an open circuit method of testing, as this term is generally understood, and the connecting ends of the units are not short circuited during the test.

Heretofore, in testing apparatus, as at present in use, a serious defect is that the operator is liable to injury from the high tension currents, as the terminals or testing points of the testing device have been virtually the ends of a conductor which, in the testing operation, completely short-circuited the insulator units. We have remedied this defect, and have also constructed a testing device which may be used safely under all practical working conditions, by electrically separating the terminal or testing points, while yet maintaining them in such position relative to each other as to allow them to test the units of the insulator.

An object of our invention therefore, is an improved method of testing for defective units of suspension type insulators installed in a transmission line while the line is operating under actual service conditions.

Another object of our invention therefore, is the provision of an improved apparatus for safely testing units of suspension type insulators in actual service.

Figure 2:
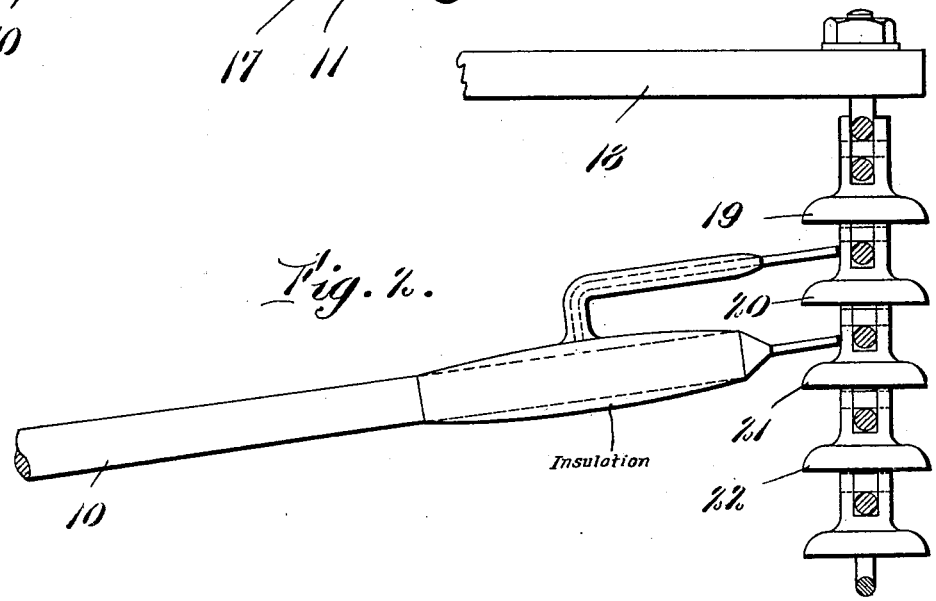
Figure 3:
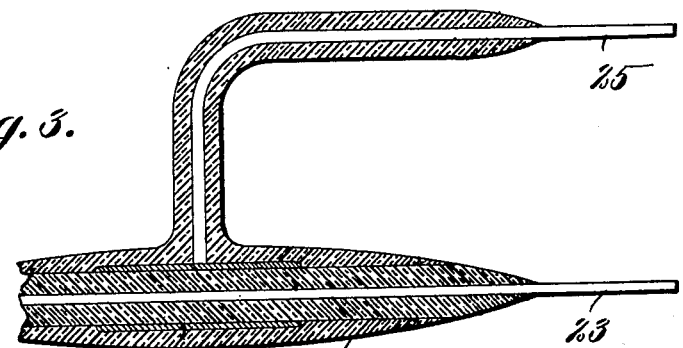

In the accompanying drawings, illustrating the preferred embodiments of our improved testing apparatus, Fig. 1 is a sectional elevation, Fig. 2 is a view showing the manner of using the apparatus in testing, and Fig. 3 is a sectional elevation of a modification of the apparatus.

Referring to the drawings, 10 designates a handle of suitable non-conducting material, such as wood, and for convenience in manufacture and use we prefer to make such handle approximately ten (10) feet long and one (1) inch in diameter, though such dimensions are not controlling in any way. At one end of the handle 10 is placed a sleeve 11 of conducting material, such as brass or copper, and into the end of the handle is driven a rod 12 of brass, copper or other suitable conducting material. Connection is made from the rod 12 to the sleeve 11 by a bolt 13, which passes through the handle 10, as clearly shown in Fig. 1. A second sleeve 14, of suitable insulating material, such as (varnished linen), bakelite or similar substances, is placed over the sleeve 11, and end of the handle 10. A third sleeve 15, of conducting material, such as brass or the like, is placed over the sleeve 14, while attached to said sleeve 15, by soldering, brazing, or in any other suitable manner, is a rod 16, of brass or the like, which rod extends laterally from the sleeve 15, and then approximately parallel to the handle 10, as shown in Fig. 1. The rods 12 and 16 are sufficiently flexible to allow of their being bent into any desired position with respect to each other, and which the operator may deem best for carrying out the required tests on the insulators. Surrounding the sleeves 14 and 15 is a sleeve 17 of insulating material.

The sleeves 11 and 15 of conducting material, together with the sleeves 14 and 17, constitute a condenser of which the rods 12 and 16 are extended terminals. Such condenser may be of any desired capacity, and ordinarily is designed to withstand any strain to which it may be subjected in service. The electrostatic capacity of the condenser is preferably made very small and the current passing through it is of such a small amount as to be unreadable on ordinary instruments. When the rods 12 and 16 therefore, are connected to a source of power, there can be no appreciable flow of current because of the presence of the condenser, so that our device, when used in connection with our improved method of testing, constitutes what is practically a device for open circuit testing, eliminating danger to the operator and to the line being tested.

While we have described the various sleeves as being placed on the handle 10 and on each other, it is to be understood that the sleeves 14 and 17 may be molded in position while in plastic form, and then vulcanized or baked to retain their shape and position.

The manner in which the apparatus is used will be apparent from an inspection of Fig. 2, where 18 designates a cross arm from which is suspended a string of units 19, 20, 21, 22, constituting a suspension type insulator, the units of which it is desired to test while the line is in service.

Each unit is tested in turn and in any desired order by placing one rod, as 12, in engagement with the connecting hook on one end of a unit, as 20, and gradually bringing the other rod, as 16, into engagement with the connecting hook on the other end of the unit. As this other conducting element approaches the other connecting end of the chosen unit, a spark or arc will be made between said conductor and end, if the unit under test is in good order. The character of the arc or spark is a sure indication of the condition of the unit giving off the same, and ranges from a good sharp arc or spark for a good unit, through the various steps of poor or weak arc or spark to an entire absence of spark or arc from a unit that is totally defective.

By employing a condenser located between the conducting elements, and to the terminals of which the conducting elements are attached, it is practically impossible to short circuit any unit of a string, as this term is generally understood, and therefore, impossible to knock down the line even though the unit under test is the only good unit in the string. This open circuit method of testing is particularly valuable where there are but two units in a string, as being an open circuit method, it is immaterial which unit is tested first.

This method is also a direct method of testing of the units and no preliminary test is necessary. Further, while care and skill on the part of the operator are always desirable, they are not essential, and an unskilled operator may test by this method with fair results without injury either to himself or to the line.

In Fig. 3 we have shown a modification in which the handle 10 has driven in its end a rod 23, such rod not only constituting one terminal of the condenser, but one plate of such condenser. The second plate is formed by the sleeve 24 placed on the outside of the handle. To this second plate is attached the rod 25, as shown.

Surrounding the sleeve 24 and handle 10 is the insulating member 26, which also surrounds the rod 25 for a portion of its length.

While we have described the various details of construction of our improved apparatus somewhat at length, it is to be understood that we may vary the size, shape, and arrangement of parts within wide limits without departing from the spirit of the invention.

Having thus described our invention, what we claim as new and desire to secure by Letters Patent, is;—

1. An apparatus for testing the insulating qualities of suspension type insulators on live transmission lines, comprising a support, a condenser mounted thereon, and a conducting element attached to each side of the condenser and extending outwardly therefrom into position to engage with the connecting ends of any unit of the string of insulators.

2. An apparatus for testing the insulating qualities of suspension type insulators on live high tension transmission lines comprising, a support of non-conducting material, a metallic element forming one electrode of a condenser, a conducting element attached to the said metallic element and extending outwardly from the support, a cylinder of insulating material surrounding the said metallic element and forming the dielectric of the condenser, a second metallic element surrounding the dielectric and forming the second electrode of the condenser, and a conducting element attached to said second metallic element and extending outwardly but spaced apart from the first said conducting element.

3. An apparatus for testing the insulating qualities of suspension type insulators subject to voltage stress from any source of electrical energy, comprising a support, a condenser mounted thereon, and a conducting element attached to each side of the condenser and extending outwardly therefrom into position to engage with the connecting ends of any unit of the string of insulators.

4. The method of testing and locating defective units of a string of suspension type insulators on live transmission lines, which consists in including the connecting ends of each unit of the string in an open circuit including a condenser interposed intermediate the ends of such circuit to draw arcs therefrom to ascertain the insulating qualities of the string of insulators.

5. The method of testing and locating defective units of a string of suspension type insulators on live transmission lines, which consists in bringing one end of a conductor into engagement with one of the connecting ends of a unit of the string of insulators, attaching the other end of the conductor to one terminal of a condenser, attaching the other terminal of the condenser to a second conductor, and gradually bring the other end of the second conductor into engagement with the other connecting end of the unit of the string of insulators, to draw arcs therefrom to ascertain the insulating qualities of the unit.

6. The method of testing and locating defective units of suspension type insulators on live transmission lines, which consists in including the connecting ends of any unit of a string of insulators in an open circuit including a condenser interposed intermediate the ends of such circuit, and drawing arcs from the connecting ends of such unit to ascertain the insulating qualities of the unit.

In testimony whereof, we have signed our names to this specification.

CHARLES L. KASSON.
THOMAS H. HAINES.